United States Patent Office

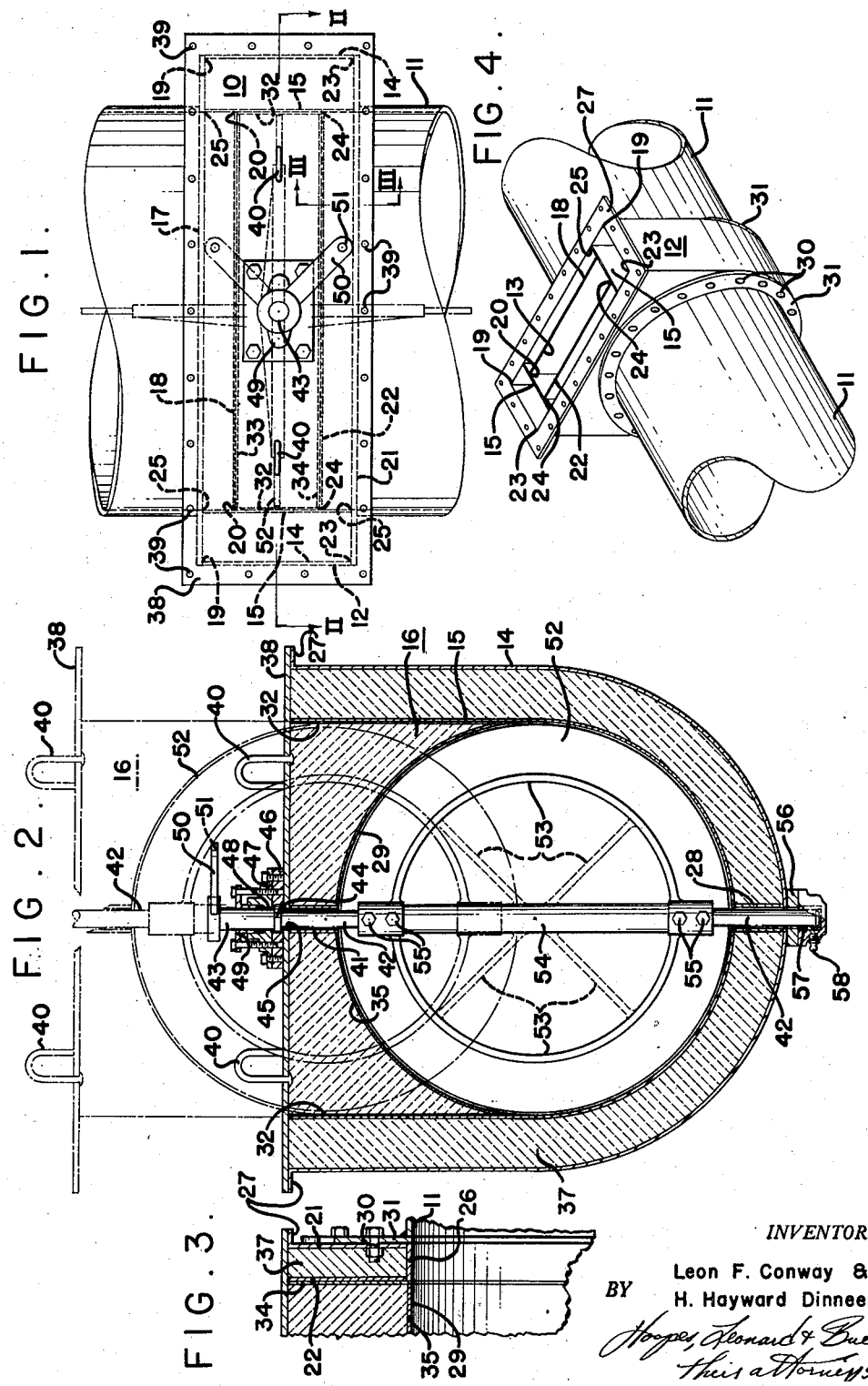
INVENTORS
Leon F. Conway &
H. Hayward Dinneen
BY

2,902,254
Patented Sept. 1, 1959

2,902,254

BUTTERFLY TYPE VALVE

Leon F. Conway, Whitehall, and Henry Hayward Dinneen, Mount Lebanon Township, Allegheny County, Pa.; said Dinneen assignor to Rust Furnace Company, Pittsburgh, Pa., a corporation of Delaware, and said Conway assignor to Bloom Engineering Company, Inc., Pittsburgh, Pa., a corporation of Pennsylvania Application December 28, 1956, Serial No. 631,121

3 Claims. (Cl. 251—305)

This invention relates to butterfly valves. More particularly, this invention pertains to a new butterfly valve having a removable arch and valve disc subassembly for use even under severe service conditions including, e.g., hot air systems for heat-treating furnaces.

In the combustion air system for billet and slab heating furnaces in the steel and metallurgical industries, butterfly valves have been used to regulate the flow of air to the particular zone or zones in the furnace to which the connections therefrom lead. Heretofore, such butterfly valves have required relatively extensive construction and support particularly when relatively large as often is the case. In particular, such prior practice construction has often involved the difficulty of lining up bearings for the relatively heavy valve discs and the making of a provision for any needed insertion or removal of such valves has often occasioned the need to independently support the pipes or ducts in which such valve is to be or was connected, at least until such connection is made. The problems in these matters are augmented in systems utilizing preheated air, especially when in the higher temperature ranges.

The foregoing deficiencies of prior practices have been overcome in this invention. Herein, the valve casing remains in connected place and position even if for any reason the valve disc is to be removed. Moreover, in this invention an arched section is provided to fit the casing and to be lowered, in the usual embodiment, into the casing. A relatively simple guide may be provided for the lower end of the valve stem and substantially avoids the prior difficulty of lining up plural bearings. Moreover, in our invention, the valve disc is suspended from and is made a part of an arch and valve disc subassembly, the seating for which is provided by the underside of such arch and the lower part of the inside of such casing. At the same time, provision may be made for the insulating of the casing and arch where, for example, the new butterfly valve is to be employed in systems, whether air or other fluid, in which the fluid is in a heated condition.

Other objects and advantages will be apparent from the following description and the accompanying drawings, which are illustrative of one embodiment only, in which Figure 1 is a plan view of one embodiment of a new butterfly valve assembly of this invention;

Figure 2 is a sectioned view in end elevation taken along line II—II of Figure 1, with the entire valve shown in full lines in assembled relation;

Figure 3 is a detail view of a part of the assembly taken along line III—III of Figure 1; and Figure 4 is a perspective view of the casing of the illustrated embodiment in place in a duct, with the arch and valve disc subassembly removed.

Referring to the drawings, one butterfly valve embodiment 10 of this invention may be employed to regulate the flow of, e.g., heated air through a duct 11 which, as shown, is of metal and which may be a part of the hot air system for a heat-treating furnace or used in some other industrial connection. Embodiment 10 comprises a casing 12 which is open at the top 13. Casing 12 employs an outer U-shaped shell 14 and an inner U-shaped shell 15 in transversely spaced relation to one another. The longitudinal length of inner shell 15 is less than the longitudinal length of the outer shell 14, such length of the inner shell roughly corresponding to the longitudinal thickness of the arch 16 forming a part of the valve construction 10.

The front and back of casing 12 are completed by means of end plates. Thus, outer front end plate 17 and inner front end plate 18 respectively extend to the corners 19 and 20 where they are joined to the inner and outer shells 14 and 15 respectively as by welding thereto. Likewise, the outer back end plate 21 and inner back end plate 22 are respectively joined at the corners 23 and 24 to the outer and inner shells 14 and 15 respectively. Since the longitudinal length of inner shell 15 is the same as that of outer shell 14, the corners 25 at the front and rear edges of inner shell 15 may also be welded to the outer end plates, thereby helping to rigidify casing 12 which may be made of sheet metal.

The outer end plates are provided with an opening 29 therethrough equal to the internal diameter of the duct 11 and in registry therewith, an invert semicircular member 26 closing the upper side of such opening respectively between the respective pairs of end plates at the front and back of casing 12. If desired, either loose refractory such as vermiculite, or castable refractory of low or high density, indicated at 37, may be placed in the space between the shells 14 and 15, in the space between end plates 17 and 18 and in the space between the end plates 21 and 22, thereby fully insulating casing 12 on all sides except at the opening 13 at the top. A transversely extending horizontal flange 27 may be provided on outer shell 14 for support purposes. A vertical sheet metal line 28 in the longitudinal and transverse center of casing 12 defines a lower vertical passage extending through the bottom thereof between the shells 14 and 15.

Around the periphery of opening 29, the outer end plates 17 and 21 may be provided with a series of openings extending therethrough in registry with openings 30 in the abutting flanges 31 of the duct portions 11 adjoining the front and back of casing 12. The openings through the outer end plates may have nuts welded to the inside thereof as shown in Figure 3 so that bolts may be passed through the openings 30 and through the openings in the outer end plates to engage and rigidly fasten casing 12 to the respective flanges 31. As shown, the ducts 11 are not covered with lagging or other insulation for convenience of illustration but normally would be so covered in any system for the flow of a hot fluid. In the case of certain heat-treating furnaces, pre-heated air in the neighborhood of 600° F. and up is sometimes prescribed. In some cases, too, the duct 11 may be made of brickwork or other refractory and still employ a new butterfly valve construction of this invention.

Arch member 16 may be made of a hollow construction having side plates 32 and front and back plates 33 and 34 respectively. An invert semicircular plate 35 forms the underside of arch 16 and is in longitudinal alignment with invert member 26. Thereby, a continuous opening through valve 10 is formed equal to the internal diameter of the duct 11 and having its lower half comprising the curved portion of inner casing shell 15 and its upper half comprising the invert members 26 and 35. Such sheet metal members lining the opening 29, including the portion thereof on the underside of arch 16, constitute a valve seat, particularly in certain hot air systems where there is generally some crack left even when the valve is closed to take care of differential contractions or expansions or other purpose. The space bounded by the plates 32, 33, 34 and 35 in arch 16 may be filled with a refractory or insulating material 36 in the same manner as the insulation 37 is shown in the space between the walls of casing 12. Under some circumstances of use, the space between the casing walls and between the arch walls may be left empty. Whether with or without such insulation, devices made in accordance with this invention are relatively lightweight, relatively simple to fabricate and relatively easy to put together or to take apart as occasion may require.

The top of arch 16 may be closed by a cover plate 38 which overlaps sufficiently front and back and to the sides so that the periphery of cover 38 is in registry with the periphery of flange 27, bolt holes 39 being provided in alignment through both thereof for fastening the parts together if necessary or desirable. Lifting eyes 40 are riveted or otherwise affixed to cover 38. Such eyes 40 may, instead, be rings either positioned in countersunk recesses in cover 38 or pivotally connected to cover 38 so that they will lie flat against it when not in use, particularly when, for example, cover 38 is flush with a floor or platform on which workmen walk.

A sheet metal tube 41 defines an upper vertical passage in the transverse and longitudinal center of arch 16. That upper vertical passage is in alignment with the lower vertical passage through tubular lining 28. Upper vertical passage 41 has the upper part of a valve stem 42 extending therethrough. A thrust cap 43 fits over the top of stem 42 and is rigidly affixed thereto. Cap 43 is provided with a flange 44 which is larger than an opening 45 in cover 38, the opening 45 being in alignment with the passage through tube 41. Hence, valve stem 42 is suspended by means of cap 43 from arch 16. A packing bearing is formed by a lower plate 46 and an upper box 47, suitably affixed to cover 38, the box 47 having an opening through which cap 43 extends upwardly. Packing box 47 is provided with inwardly extending shoulders 48 which are above flange 44 and have an opening therethrough smaller in diameter than the flange 44, thereby preventing any vertical movement of cap 43 and stem 42 relative to arch 16, while at the same time permitting relative rotation therebetween. Packing is provided in box 47 and a gland 49 caused to press thereon to provide a packed joint around cap 43. The top of cap 43 is provided with an arm 50 welded thereto having a hole 51 therein by means of which the arm 50 may be swung through a quadrant angle between the full line and dash-and-dot line positions shown in Figure 1 in the course of moving a valve disc 52 from fully closed to fully open position. Any intermediate regulating position between those extremes that may be desired may also be selected.

As shown, valve disc 52 is circular in front elevation and may be provided with circumferential and radial stiffening ribs 53. Valve disc 52 is rigidly fixed to a sleeve 54 through which valve stem 42 is free to slide until disc 52 is in the proper position therealong whereupon set screws 55 are tightened to fix disc 52 in place relative to stem 42. The periphery of the disc 52, when in fully closed position in valve 10, is preferably equidistant from the valve seat formed by casing 12 and the underside of arch 16, as shown in full lines in Figure 2. Although such valve seat as shown is flush with the sides of the opening 29 through the casing and arch of valve 10, other provision may be made such as a circumferential ridge opposite the peripheral edge of valve disc 52 when that valve disc is in fully closed position, to serve as a valve seat, if desired. In such a case, the lower part of the ridge valve seat would be affixed to the curved portion of inner shell 15 and the upper part thereof would be separate therefrom and affixed to the invert member 35 on the underside of arch 16.

The lower part of valve stem 42 passes through the opening in liner tube 28 and passes downwardly through an opening in a block 56 before entering a guide bushing 57 fastened to block 56. The opening in guide bushing 57 is in the nature of a socket with its lower end closed, access being provided to the socket interior through tube 28 and from the outside through a fitting 58 which normally may be used for the injection of lubricant into the bushing socket 57. Enough play is provided in the suspended mounting of stem 42 and valve disc 52 from arch 16 so that no difficulty arises in inserting the lower end of stem 42 into the opening 28 and bushing 57 as arch 16 is lowered from the dot-and-dash line position shown in Figure 2 to the full line position shown in Figure 2.

Conversely, should it be desired to clean the valve seat of valve 10 or to inspect or perform maintenance work on arch 16 or the balance of valve 10, the arch 16 may be lifted vertically after any bolts holding cover 38 to flange 27 are removed. Such lifting of arch 16 by eyes 40 will, after arm 50 is disconnected from its operating linkage, lift the arch and valve disc subassembly out of casing 12 until the purpose of such disassembly is satisfied. It is likewise a relatively simple and inexpensive matter to reposition the arch 16 and valve disc 52 subassembly in casing 12 by passing it through the opening 13.

It will be noted that even though arch 16, valve stem 42 and valve disc 52 may be entirely removed from the vicinity of casing 12, the casing remains in place and continues to serve its connecting and supporting function relative to the adjoining ends of duct 11. Thus, casing 12 remains ready for the return of arch 16 and the valve disc thereafter or for the placement therein of an interchangeable arch and valve disc dimensionally corresponding to the arch and valve disc that were removed.

Although herein the terms "top,", "bottom," "upper," "lower," "front," "back," "vertical," "horizontal" and "sides" have been used, it will be understood that such terms and the like are used in a relative sense. Various modifications of the illustrated embodiment may be made and the invention may take other forms without departing from the spirit hereof or the scope of the appended claims.

We claim:

1. In a butterfly type valve, comprising, a casing having a longitudinally extending flow passageway, said casing being formed of a pair of U-shaped nested shells of different transverse dimensions the upper edge of which terminates in a common plane, the longitudinal dimension of said U-shaped shells defining a first and second end of said casing, spaced pairs of plates extending transversely of said casing, one pair of said plates being joined to the first and second ends of said U-shaped shells, the other pair of plates being joined to the U-shaped shell which is of a lesser transverse dimension, insulating material between said shells and said end plates, said end plates being provided with an opening of substantially the same diameter as said flow passageway, said U-shaped shell of lesser transverse dimension and said other pair of plates together defining a rectangular opening extending through said upper edge of said casing and in communication with said longitudinally extending flow passageway, a cylindrical sheet metal invert liner for said longitudinally extending flow passageway extending between said plates at said first and second end of said casing, said liner terminating in edges which are welded to said plates, a first central vertical passage extending downwardly through the bottom of said casing, a socket guide bushing fastened to the bottom of said casing in vertical alignment with said first passage, the curved portion of said U-shaped shell of lesser transverse dimension serving in its transverse plane as one-half of a seat for said valve, a rotatable valve stem, a valve disc adjustably secured to said valve stem, a removable hollow arch which fills the rectangular opening, a cover on said arch extending in a plane parallel to said common plane to overlie said upper edge of the casing around the entire periphery thereof, a face on said arch in spaced relationship from said cover being of a curved crown configuration and in flush alignment with said invert liner to define the remainder of said valve seat, a second central vertical passage through said arch in alignment with said first-named vertical passage through the bottom of said casing, insulating material between the said cover and said face of the arch and surrounding the passage therein, lifting lugs for said arch, a thrust bearing positioned on the cover of said arch in vertical alignment with the passage through said arch, said valve stem extending through said second passage, a cap adjacent the top of said stem fixed thereto for engagement by said bearing to suspend said valve stem and disc, and means to rotate said cap to rotate said valve stem and disc when said arch is in place in said casing with the lower end of said valve stem in said guide bushing.

2. In a butterfly type valve, comprising, a casing having a longitudinally extending flow passageway, said casing being formed of a pair of U-shaped nested shells of different transverse dimensions having a common upper edge, the longitudinal dimension of said U-shaped shells defining a first and second end of said casing, spaced pairs of plates extending transversely of said casing, one pair of said plates being joined to the first and second ends of said U-shaped shells, the other pair of plates being joined to the U-shaped shell which is of a lesser transverse dimension, said end plates being provided with an opening of substantially the same diameter as said flow passageway, said U-shaped shell of lesser transverse dimension and said other pair of plates together defining an arch opening extending through said upper edge of said casing and as wide as and in communication with said longitudinally extending flow passageway, an invert liner for said longitudinally extending flow passageway extending between said plates at said first and second end of said casing, said liners terminating in edges which are joined to said plates, a first passage in the bottom of said casing, the curved portion of said U-shaped shell of lesser transverse dimension serving in its transverse plane as one-half of a seat for said valve, a rotatable valve stem and valve disc, a removable hollow arch which fills said arch opening, a cover on said arch connected to said common upper edge, a face on said arch in spaced relationship from said cover being of a curved crown configuration and in flush alignment with said invert liner to define the remainder of said valve seat, a second passage through said arch in alignment with said first-named passage in the bottom of said casing, bearing means for an upper portion of said valve stem and disc connected to said arch in vertical alignment with the passage through said arch to suspend said valve stem and disc from said arch, a lower portion of said valve stem extending into said first passage, and means to rotate said valve stem and disc when said arch is in place in said casing with the lower end of said valve stem in said guide bushing.

3. In a butterfly type valve, comprising, a generally U-shaped casing having a longitudinally extending flow passageway and an arch-connecting outer edge, the longitudinal dimension of said casing defining a first and second end thereof, a spaced pair of plates extending transversely of said casing and forming the first and second ends of said U-shaped casing, said end plates being provided with a flow passage opening of substantially the same diameter as said flow passageway, said U-shaped casing inclusive of said pair of plates together defining an arch opening extending substantially straight through said outer edge of said casing and in communication with said longitudinally extending flow passageway, said arch opening being between said pair of plates and substantially as wide as said flow passageway, valve stem guide means positioned at the bottom of said flow passageway in said casing, the interior curved portion of said U-shaped casing serving in its transverse plane as the lower portion of a valve seat, a valve comprising a rotatable valve stem and valve disc, a removable hollow arch which substantially fills said opening and is connectible to said outer edge of said casing to close said opening, a face on said arch of a curved crown configuration in spaced relationship to said outer edge to define the remainder of said valve seat, a second valve stem guide means in said arch in alignment with said first-named guide means, bearing means connecting said arch to said valve stem and disc, and means to rotate said valve stem and disc when said arch is in place in said casing with the lower end of said valve stem in said first-named guide means.

References Cited in the file of this patent

UNITED STATES PATENTS

| | | |
|---|---|---|
| 443,326 | Leverich | Dec. 23, 1890 |
| 1,541,047 | Hart | June 9, 1925 |
| 2,352,799 | Newton | July 4, 1944 |
| 2,750,955 | Bredlschneider | June 19, 1956 |
| 2,753,147 | Welge | July 3, 1956 |

FOREIGN PATENTS

| | | |
|---|---|---|
| 493 | Great Britain | Jan. 10, 1891 |
| 162,353 | Germany | July 28, 1905 |